US011739735B2

(12) United States Patent
Bautista Rabanal et al.

(10) Patent No.: US 11,739,735 B2
(45) Date of Patent: Aug. 29, 2023

(54) ELECTRIC CHARGE DISSIPATION SYSTEM FOR A WIND TURBINE BLADE, WIND TURBINE BLADE AND RELATED METHOD

(71) Applicant: Siemens Gamesa Renewable Energy Innovation & Technology S.L., Sarriguren (ES)

(72) Inventors: Yolanda Bautista Rabanal, Castellón (ES); Adriana Belda Peña, Puçol (ES); Victor March Nomen, Les Fonts (ES); Almudena Muñoz Babiano, Madrid (ES); Vicente Sanz Solana, Valenica (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 108 days.

(21) Appl. No.: 17/421,744

(22) PCT Filed: Jan. 14, 2020

(86) PCT No.: PCT/EP2020/050812
§ 371 (c)(1),
(2) Date: Jul. 9, 2021

(87) PCT Pub. No.: WO2020/148279
PCT Pub. Date: Jul. 23, 2020

(65) Prior Publication Data
US 2022/0099068 A1    Mar. 31, 2022

(30) Foreign Application Priority Data

Jan. 16, 2019   (ES) ................. ES201900007

(51) Int. Cl.
*F03D 80/30*         (2016.01)
*H02G 13/00*         (2006.01)

(52) U.S. Cl.
CPC .......... *F03D 80/30* (2016.05); *F05D 2260/30* (2013.01); *H02G 13/80* (2013.01)

(58) Field of Classification Search
CPC .......... F02D 80/30; B64D 45/02; H02G 13/80
See application file for complete search history.

(56) References Cited

U.S. PATENT DOCUMENTS

| 2,497,924 | A | 2/1950 | Beach |
| 3,260,893 | A | 7/1966 | La |

(Continued)

FOREIGN PATENT DOCUMENTS

| DE | 10022128 C1 | 12/2001 |
| DE | 102004012946 A1 | 10/2005 |

(Continued)

OTHER PUBLICATIONS

International Search Report and Written Opinion for PCT/EP2020/050812 dated May 6, 2020.

*Primary Examiner* — Long T Tran
(74) *Attorney, Agent, or Firm* — Schmeiser, Olsen & Watts LLP

(57) ABSTRACT

Provided is an electric charge dissipation system for a wind turbine blade in compliance with lightning protection system and/or with the capacity of mitigating dirt problems in wind turbine generator blades. Also provided is the wind turbine blade including the electric charge dissipation system. Further provided is a method for dissipating electric charges in a wind turbine blade.

25 Claims, 4 Drawing Sheets

(56) References Cited

U.S. PATENT DOCUMENTS

| | | | |
|---|---|---|---|
| 5,716,193 | A | 2/1998 | Mondet et al. |
| 7,390,169 | B2 | 6/2008 | Larsen et al. |
| 9,404,371 | B1* | 8/2016 | McDonald ............. F01D 5/147 |
| 2003/0170122 | A1 | 9/2003 | Wobben |
| 2007/0009361 | A1 | 1/2007 | Moller Larsen |
| 2012/0020791 | A1 | 1/2012 | Flemming et al. |
| 2017/0268486 | A1* | 9/2017 | Müller ................... F03D 7/042 |
| 2017/0350373 | A1 | 12/2017 | Hansen |
| 2017/0356426 | A1* | 12/2017 | Nieuwenhuizen ..... H02G 13/80 |
| 2019/0234376 | A1* | 8/2019 | Akay .................... F03D 1/0641 |
| 2019/0390656 | A1* | 12/2019 | Dahl ....................... F03D 80/30 |
| 2020/0056582 | A1* | 2/2020 | Schuring Roelof .. F03D 1/0675 |
| 2020/0240391 | A1* | 7/2020 | Lübker .................. B32B 27/40 |
| 2020/0291925 | A1* | 9/2020 | Garcia Perez ......... H01R 39/44 |
| 2021/0088026 | A1* | 3/2021 | Wood ................... F03D 1/0675 |
| 2021/0239101 | A1* | 8/2021 | Bech .................... F03D 1/0675 |

FOREIGN PATENT DOCUMENTS

| | | |
|---|---|---|
| DK | 200201745 A | 5/2004 |
| EP | 1 577 551 A2 | 9/2005 |
| EP | 1577551 A2 | 9/2005 |
| EP | 1577551 B1 | 7/2012 |

\* cited by examiner

A-A

B-B

ELECTRIC CHARGE DISSIPATION SYSTEM FOR A WIND TURBINE BLADE, WIND TURBINE BLADE AND RELATED METHOD

CROSS-REFERENCE TO RELATED APPLICATIONS

This application claims priority to PCT Application No. PCT/EP2020/050812, having a filing date of Jan. 14, 2020, which is based on ES Application No. P201900007, having a filing date of Jan. 16, 2019, the entire contents both of which are hereby incorporated by reference.

FIELD OF TECHNOLOGY

The following relates to an electric charge dissipation system for a wind turbine blade.

SUMMARY

An aspect relates to an electric charge dissipation system for a wind turbine blade. This following relates to electric charge dissipation systems in compliance with lightning protection system and/or with the capacity of mitigating dirt problems in wind turbine generator blades.

A second aspect of the invention is the wind turbine blade comprising the electric charge dissipation system.

A third aspect of the invention is a method for dissipating electric charges in a wind turbine blade.

BACKGROUND

It is known in the state of the art document U.S. Pat. No. 2,497,924 that deal with the problem of static electricity on aircraft surface. This problem became in the aircraft industry with the inclusion of electrical stuff in aircrafts and the malfunction of the devices when submitted to thunderclouds and ice, rain, or dust. Moreover, aircraft is isolated from the ground. Therefore, it is not possible to have a cable to the ground during flight to dissipate the static electricity. This system is based on corona dischargers disposed in the aircrafts wings which are connected to the metallic surface and discharge static electricity to the air. This reduces aircraft potential rise which protects electrical and electronic devices.

It is also known document U.S. Pat. No. 3,260,893 related to an electrostatic discharging system for aircraft which compensates the natural potential to which the aircraft is submitted, by using a system based on a generator which can generate DC high voltages in order to lead aircraft to the same natural potential in that region. It comprises also a sensor to measure the reference potential to which the generator needs to acquire.

The applicant doesn't know any electric charge dissipation system for a wind turbine blade which solves the above-mentioned drawbacks.

The electric charge dissipation system for a wind turbine blade and the related method of the present invention solve the above cited drawbacks providing an electric charge dissipation system for a wind turbine blade which avoids static electricity on blade surface and static electricity accumulated on lightning protection systems without influencing the operation of the lightning protection system itself.

The present invention relates to an electric charge dissipation system for a wind turbine blade wherein the static electricity collects charged particles and these are guided to the blade root.

Furthermore, the electric charge dissipation system for a wind turbine blade of the present invention solves the following drawbacks of the state of the art:
Avoids static electricity on blade surface due to:
  Precipitation static:
    the wind turbine's presence in a thunderstorm, and
    the triboelectric charging (frictional) caused by neutral snow, rain, sand storm or,
    dust particle bombardment of the blade frontal surface.
Avoids static electricity accumulated on lightning protection system without influencing the operation of the lightning protection system itself.
Mitigates dirt accumulation by reducing static charge.

The electric charge dissipation system for a wind turbine blade, wherein the wind turbine blade comprises a root, an internal surface, an external surface, and a first conductive paint disposed at least partially on the external surface, comprises:
  at least one metallic receptor assembly disposed at least partially on the external surface of the blade, and
  at least one conductor cable connected to the at least one metallic receptor assembly, and, wherein the system further comprises at least one first anti-static element configured to electrically connect the first conductive paint disposed at least partially on the external surface of the blade with the at least one metallic receptor assembly.

Optionally, the wind turbine blade comprises a metallic plate for connecting the blade to a hub of a wind turbine, wherein the at least one conductor cable is also connected to the metallic plate.

In an embodiment, the at least one first anti-static element is a resistive element comprising a resistance in the interval $[1\ k\Omega, 10\ M\Omega]$.

Thus configured, the electric charge dissipation system for a wind turbine blade of the present invention allows to discharge the static charge optionally to the hub through the metallic plate, being preferably a ring of a bearing of the blade, without being affected by any lightning strike since usually lightning strikes remove paint close to the metallic receptor assembly interrupting the path between the first conductive paint disposed at least partially on the external surface of the blade and the conductor cable connected to the at least one metallic receptor assembly. Besides, the at least one first anti-static element so configured assures the contact between the first conductive paint and the at least one metallic receptor assembly.

Optionally, the metallic receptor assembly comprises:
  at least one metallic bolt receptor disposed on the external surface of the blade, and
  at least one metallic block receptor connected to the at least one metallic bolt receptor.

Optionally, the system further comprises at least one second anti-static element disposed between the at least one conductor cable and the metallic plate that avoids the flow of lightning currents through it, acting as an insulator for the currents.

In an embodiment, the at least one second anti-static element is disposed adjacent to metallic plate.

In an embodiment, the at least one second anti-static element is disposed, at least partially, on the internal surface of the blade.

In an embodiment, the at least one second anti-static element is a resistive element comprising a resistance in the interval $[1\ k\Omega, 10\ M\Omega]$.

In an embodiment, the at least one second anti-static element comprises a paint mat that minimizes the painting in the blade.

Alternatively, the at least one second anti-static element comprises a bar that allows a faster assembly of the at least one second anti-static element between the at least one conductor cable and the metallic plate in a similar way to a plug and play device.

Optionally, the system further comprises a metallic band disposed on the external surface of the blade, being adjacent to at least one third anti-static element, wherein between the metallic band and the at least one third anti-static element, and the external surface of the blade, a second conductive paint or sheet or piece is disposed, wherein the metallic band is connected to the at least one conductor cable. This constitutes an additional collecting point for static electricity.

In an embodiment, the metallic band, the at least one third anti-static element and the second conductive paint or sheet or piece are disposed in the root of the blade.

In an embodiment, the first conductive paint disposed at least partially on the external surface of the wind turbine blade comprises a surface resistivity ≤$10^{12}$ Ω/sq, being two orders of magnitude below the state of the art conductive paints.

In an embodiment, the at least one third anti-static element comprises a surface resistivity ≤$10^{12}$ Ω/sq, being two orders of magnitude below the state of the art conductive paints.

Embodiments of the present invention also relate to a wind turbine blade comprising the electric charge dissipation system described above.

Embodiments of the present invention also relate to a method for dissipating electric charge in a wind turbine blade, wherein the wind turbine blade comprises:
  a root
  an internal surface,
  an external surface,
  a first conductive paint disposed at least partially on the external surface,
  at least one metallic receptor assembly disposed at least partially on the external surface, and
  at least one conductor cable connected to the at least one metallic receptor assembly, and wherein the method comprises a first stage of electrically connecting the first conductive paint disposed at least partially on the external surface of the blade with the at least one metallic receptor assembly by at least one first anti-static element.

Optionally, the wind turbine blade comprises a metallic plate for connecting the blade to a hub of a wind turbine and the method further comprises a second stage of electrically connecting the at least one conductor cable to the metallic plate.

In an embodiment, the first stage of electrically connecting the first conductive paint disposed at least partially on the external surface of the blade with the at least one metallic receptor assembly by the at least one first anti-static element is carried out placing a resistive element comprising a resistance in the interval [1 kΩ, 10 MΩ].

In an embodiment, the second stage of electrically connecting the at least one conductor cable to the metallic plate is carried out by at least one second anti-static element.

In an embodiment, the second stage of electrically connecting the at least one conductor cable to the metallic plate by the at least one second anti-static element is carried out in a place located adjacent to metallic plate, preferably in a place located at least partially on the internal surface of the blade.

In an embodiment, the second stage of electrically connecting the at least one conductor cable to the metallic plate by the at least one second anti-static element is carried out placing a resistive element comprising a resistance in the interval [1 kΩ, 10 MΩ].

Optionally, the method further comprises an additional stage of electrically connecting a metallic band disposed on the external surface of the blade, metallic band preferably disposed in the root of the blade, to the at least one conductor cable.

BRIEF DESCRIPTION

Some of the embodiments will be described in detail, with reference to the following figures, wherein like designations denote like members, wherein.

Figure 1:
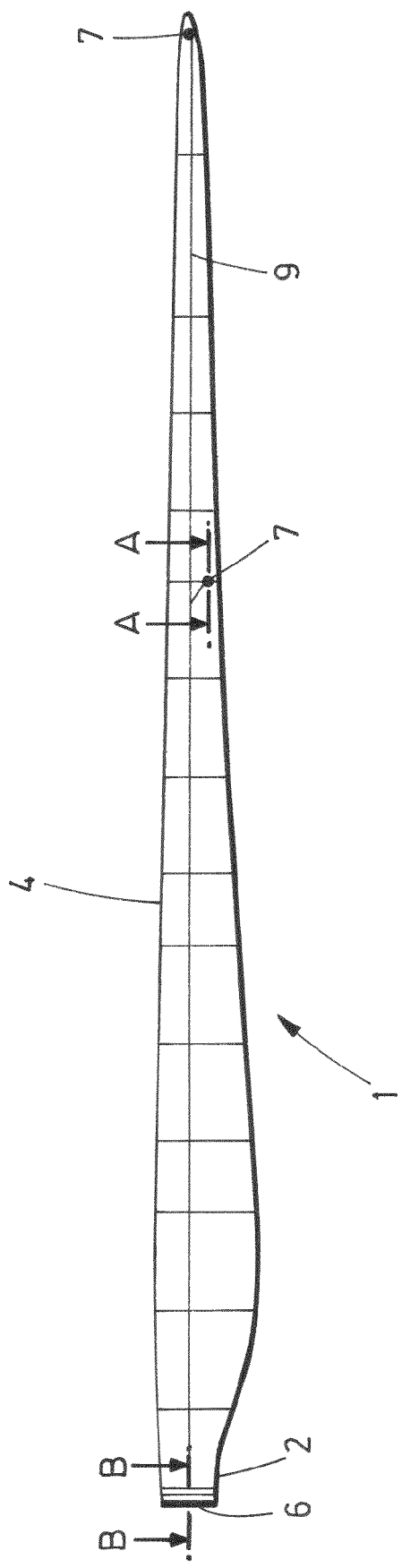
FIG. 1 shows an elevation view of the electric charge dissipation system for a wind turbine blade of embodiments of the present invention.
Figure 2:
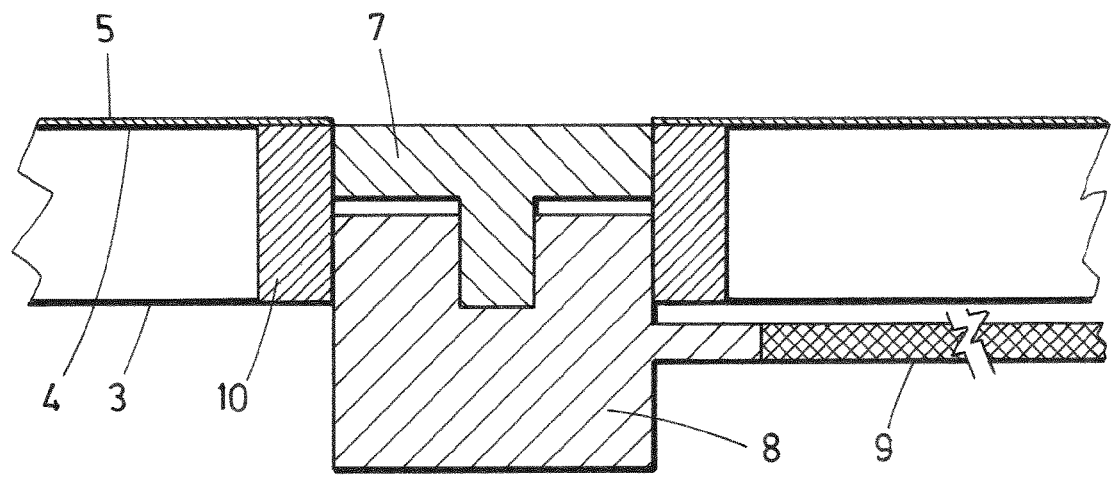
FIG. 2 shows a section view AA of the FIG. 1 wherein the at least one first anti-static element configured to electrically connect the first conductive paint disposed at least partially on the external surface of the blade with the at least one metallic receptor assembly is represented.
Figure 3:
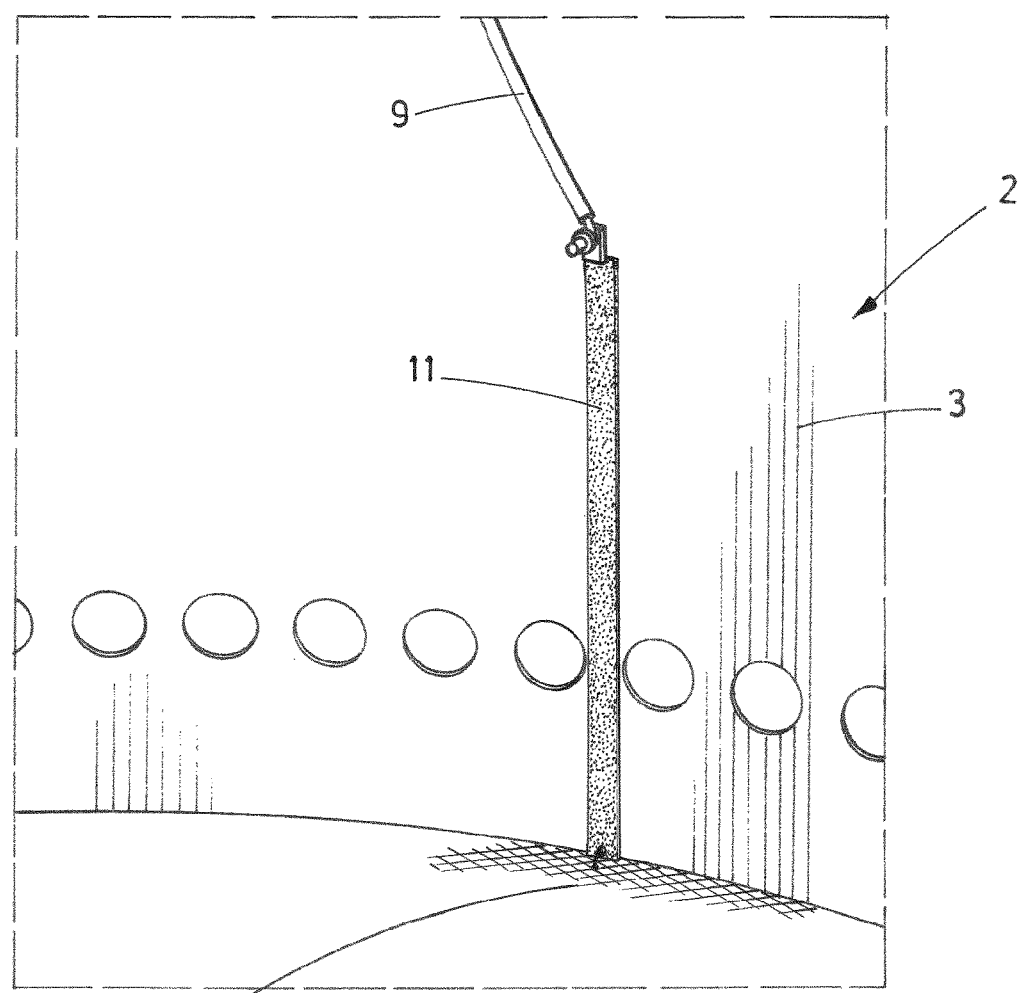
FIG. 3 shows a schematic view of the interior of the blade in the zone of the root of the blade wherein the at least one second anti-static element comprising a paint mat being disposed between the at least one conductor cable and the metallic plate is represented.
Figure 4:
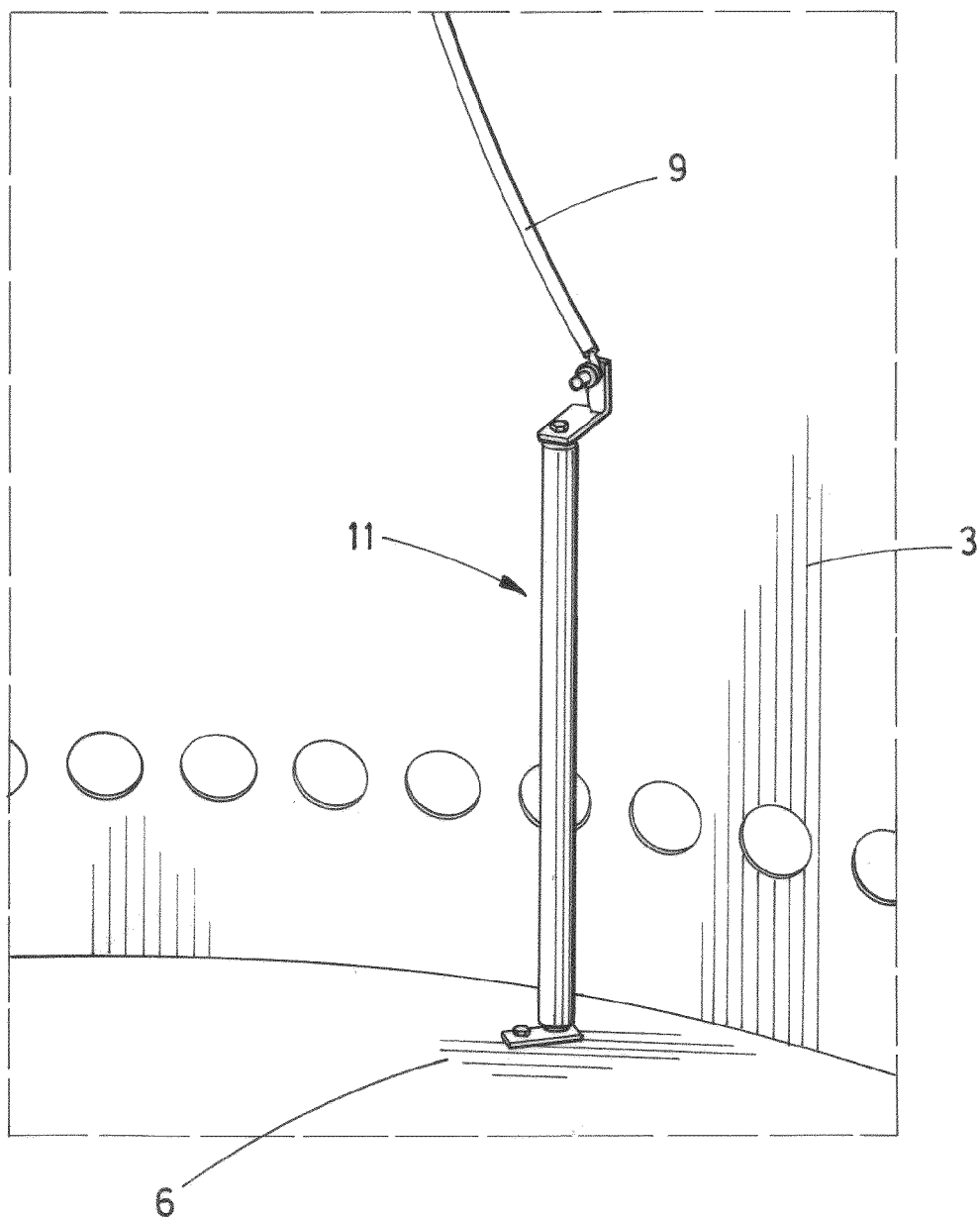
Figure 5:
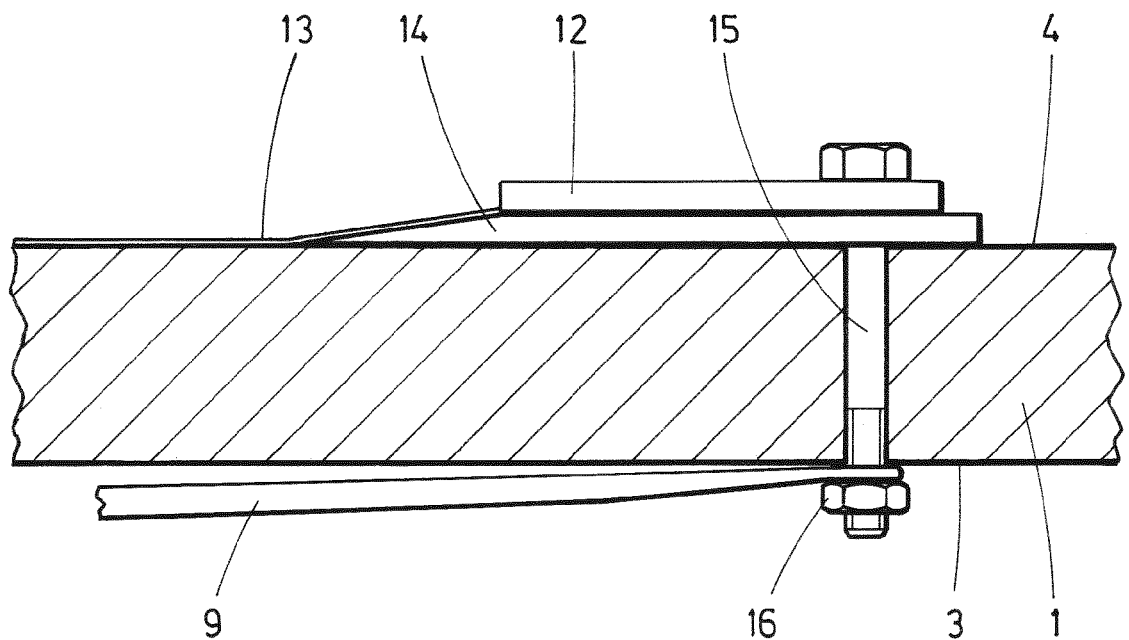

FIG. 4 shows a schematic view of the interior of the blade in the zone of the root of the blade wherein the at least one second anti-static element comprising a bar being disposed between the at least one conductor cable and the metallic plate is represented; and FIG. 5 shows a section view BB of the FIG. 1, wherein the metallic band disposed on the external surface of the blade being adjacent to the at least one third anti-static element and the second conductive paint or sheet or piece are shown.

DETAILED DESCRIPTION

In an embodiment of the invention, the electric charge dissipation system for a wind turbine blade (1), wherein the wind turbine blade (1) comprises a root (2), an internal surface (3), an external surface (4) and a first conductive paint (5) disposed at least partially on the external surface (4), comprises:
  at least one metallic receptor assembly (7, 8) disposed at least partially on the external surface (4) of the blade (1), which in turn comprises:
    at least one metallic bolt receptor (7) disposed on the external surface (4) of the blade (1), and
    at least one metallic block receptor (8) connected to the at least one metallic bolt receptor (7), and
  at least one conductor cable (9) connected to the at least one metallic receptor assembly (7, 8),
  wherein the system further comprises at least one first anti-static element (10) configured to electrically connect the first conductive paint (5) disposed at least partially on the external surface (4) of the blade (1) with the at least one metallic receptor assembly (7, 8).

Optionally, the wind turbine blade (1) comprises a metallic plate (6) for connecting the blade (1) to a hub of a wind turbine (not shown), wherein the at least one conductor cable (9) is also connected to the metallic plate (6).

The at least one first anti-static element (10) is a resistive element comprising a resistance in the interval [1 kΩ, 10 MΩ], preferably comprising a resistance in the interval [10 kΩ, 1 MΩ].

The system further comprises at least one second anti-static element (11), preferably comprising a paint mat, disposed between the at least one conductor cable (9) and the metallic plate (6), wherein the at least one second anti-static element (11) is disposed adjacent to metallic plate (6) and, at least partially, on the internal surface (3) of the blade (1).

The at least one second anti-static element (11) is a resistive element comprising a resistance in the interval [1 kΩ, 10 MΩ], preferably comprising a resistance in the interval [10 kΩ, 1 MΩ].

The system further comprises a metallic band (12) disposed on the external surface of the blade (4), being adjacent to at least one third anti-static element (13), wherein between the metallic band (12) and the at least one third anti-static element (13), and the external surface (4) of the blade (1), a second conductive paint (14) or sheet or piece is disposed, wherein the metallic band (12) is connected to the at least one conductor cable (9), preferably by a metallic stuff, preferably a bolt (15) and nut (16) system, and wherein the metallic band (12), the at least one third anti-static element (13) and the second conductive paint (14) or sheet or piece are disposed in the root (2) of the blade (1), Embodiments of the present invention also relate to a wind turbine blade (1) comprising the electric charge dissipation system described above.

Embodiments of the present invention also relate to a method for dissipating electric charge in a wind turbine blade (1), wherein the wind turbine blade (1) comprises:
  a root (2),
  an internal surface (3),
  an external surface (4),
  optionally a metallic plate (6) for connecting the blade (1) to a hub of a wind turbine,
  a first conductive paint (5) disposed at least partially on the external surface (4),
  at least one metallic receptor assembly (7, 8) disposed on the external surface, which in turn comprises:
    at least one metallic bolt receptor (7) disposed on the external surface (4) of the blade (1), and
    at least one metallic block receptor (8) connected to the at least one metallic bolt receptor (7), and
  at least one conductor cable (9) connected to the at least one metallic receptor assembly (7, 8) and to the metallic plate (6), and
wherein the method comprises a first stage of electrically connecting the first conductive paint (5) disposed at least partially on the external surface (4) of the blade (1) with the at least one metallic receptor assembly (7, 8) by at least one first anti-static element (10), and optionally a second stage of electrically connecting the at least one conductor cable (9) to the metallic plate (6).

The first stage of electrically connecting the first conductive paint (5) disposed at least partially on the external surface (4) of the blade (1) with the at least one metallic receptor assembly (7, 8) by the at least one first anti-static element (10) is carried out placing a resistive element comprising a resistance in the interval [1 kΩ, 10 MΩ], preferably placing a resistive element comprising a resistance in the interval [10 kΩ, 1 MΩ].

The second stage of electrically connecting the at least one conductor cable (9) to the metallic plate (6) is carried out by at least one second anti-static element (11), second stage carried out in a place located adjacent to metallic plate (6), preferably in a place located at least partially on the internal surface (3) of the blade.

The second stage of electrically connecting the at least one conductor cable (9) to the metallic plate (6) by the at least one second anti-static element (11) is carried out placing a resistive element comprising a resistance in the interval [1 kΩ, 10 MΩ], preferably placing a resistive element comprising a resistance in the interval [10 kΩ, 1 MΩ].

In an embodiment, the method further comprises an additional stage of electrically connecting a metallic band (12) disposed on the external surface (4) in the root (2) of the blade (1), to the at least one conductor cable (9).

The additional stage further comprises a substage of electrically connecting the metallic band (12) to at least one third anti-static element (13) adjacent to the metallic band (12), and disposing a second conductive paint (14) or sheet or piece between the metallic band (12) and the at least one third anti-static element (13), and the external surface (4) of the blade (1).

The laboratory tests support the fact that lightning currents are not able to flow through these anti-static elements (10, 11, 13), and that the insulation level is the same as for any insulator.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electric charge dissipation system for a wind turbine blade, wherein the wind turbine blade comprises a root, an internal surface, an external surface, and a first conductive paint disposed at least partially on the external surface, the system comprising:
  at least one metallic receptor assembly disposed at least partially on the external surface of the wind turbine blade;
  at least one conductor cable connected to the at least one metallic receptor assembly; and
    at least one first anti-static element configured to electrically connect the first conductive paint disposed at least partially on the external surface of the wind turbine blade with the at least one metallic receptor assembly.

2. The electric charge dissipation system according to claim 1, wherein the wind turbine blade comprises a metallic plate for connecting the wind turbine blade to a hub of a wind turbine, further wherein the at least one conductor cable is also connected to the metallic plate.

3. The electric charge dissipation system according to claim 2, further comprising at least one second anti-static element disposed between the at least one conductor cable and the metallic plate.

4. The electric charge dissipation system according to claim 3, wherein the at least one second anti-static element is disposed adjacent to the metallic plate.

5. The electric charge dissipation system according to claim 3, wherein the at least one second anti-static element is disposed, at least partially, on the internal surface of the wind turbine blade.

6. The electric charge dissipation system according to claim 3, wherein the at least one second anti-static element is a resistive element comprising a resistance in an interval [1 kΩ, 10 MΩ], or comprising a resistance in an interval [10 kΩ, 1 MΩ].

7. The electric charge dissipation system according to claim 3, wherein the at least one second anti-static element comprises a paint mat.

8. The electric charge dissipation system according to claim 3, wherein the at least one second anti-static element comprises a bar.

9. The electric charge dissipation system according to claim 1, wherein the at least one metallic receptor assembly disposed at least partially on the external surface of the wind turbine blade comprises:
at least one metallic bolt receptor disposed on the external surface of the wind turbine blade, and
at least one metallic block receptor connected to the at least one metallic bolt receptor.

10. The electric charge dissipation system according to claim 1, wherein the at least one first anti-static element is a resistive element comprising a resistance in an interval [1 kΩ, 10 MΩ], or comprising a resistance in an interval [10 kΩ, 1 MΩ].

11. The electric charge dissipation system according to claim 1, further comprising a metallic band disposed on the external surface of the wind turbine blade, being adjacent to at least one third anti-static element, wherein between the metallic band and the at least one third anti-static element, and the external surface of the wind turbine blade, a second conductive paint or sheet or piece is disposed, wherein the metallic band is connected to the at least one conductor cable.

12. The electric charge dissipation system according to claim 11, wherein the metallic band, the at least one third anti-static element and the second conductive paint or sheet or piece are disposed in the root of the wind turbine blade.

13. The electric charge dissipation system according to claim 11, wherein the at least one third anti-static element comprises a surface resistivity ≤$10^{12}$ Ω/sq.

14. The electric charge dissipation system according to claim 11, wherein the metallic band is connected to the at least one conductor cable by a metallic bolt and nut system.

15. A wind turbine blade comprising the electric charge dissipation system of claim 1.

16. The wind turbine blade according to claim 15 further comprising a root, an internal surface, an external surface and a first conductive paint disposed at least partially on the external surface, wherein the first conductive paint disposed at least partially on the external surface comprises a surface resistivity ≤$10^{12}$ Ω/sq.

17. The method for dissipating electric charge in the wind turbine blade according to claim 16, wherein the first stage of electrically connecting the first conductive paint disposed at least partially on the external surface of the wind turbine blade with the at least one metallic receptor assembly by the at least one first anti-static element is carried out placing a resistive element comprising a resistance in the interval [1 kΩ, 10 MΩ], or placing a resistive element comprising a resistance in an interval [10 KΩ, 1 MΩ].

18. A method for dissipating electric charge in a wind turbine blade, wherein the wind turbine blade includes a root, an internal surface, an external surface, a first conductive paint disposed at least partially on the external surface, at least one metallic receptor assembly disposed on the external surface, at least one conductor cable connected to the at least one metallic receptor assembly, the method comprising:
wherein a first stage of electrically connecting the first conductive paint disposed at least partially on the external surface of the wind turbine blade with the at least one metallic receptor assembly by at least one first anti-static element.

19. The method for dissipating electric charge in the wind turbine blade according to claim 18, wherein the wind turbine blade comprises a metallic plate for connecting the blade to a hub of a wind turbine and the method further comprises a second stage of electrically connecting the at least one conductor cable to the metallic plate.

20. The method for dissipating electric charge in the wind turbine blade according to claim 19, wherein the second stage of electrically connecting the at least one conductor cable to the metallic plate is carried out by at least one second anti-static element.

21. The method for dissipating electric charge in the wind turbine blade according to claim 20, wherein the second stage is carried out in a place located adjacent to the metallic plate.

22. The method for dissipating electric charge in the wind turbine blade according to claim 21, wherein the second stage is carried out in a place located at least partially on the internal surface of the wind turbine blade.

23. The method for dissipating electric charge in the wind turbine blade according to claim 19, wherein the second stage is carried out placing a resistive element comprising a resistance in an interval [1 kΩ, 10 MΩ], or placing a resistive element comprising a resistance in an interval [10 kΩ, 1 MΩ].

24. The method for dissipating electric charge in the wind turbine blade according to claim 18, further comprising an additional stage of electrically connecting a metallic band disposed on the external surface of the wind blade, to the at least one conductor cable.

25. The method for dissipating electric charge in the wind turbine blade according to claim 24, wherein the additional stage comprises a substage of electrically connecting the metallic band to at least one third anti-static element adjacent to the metallic band, and disposing a second conductive paint or sheet or piece between the metallic band and the at least one third anti-static element, and the external surface of the wind turbine blade.

* * * * *